UNITED STATES PATENT OFFICE.

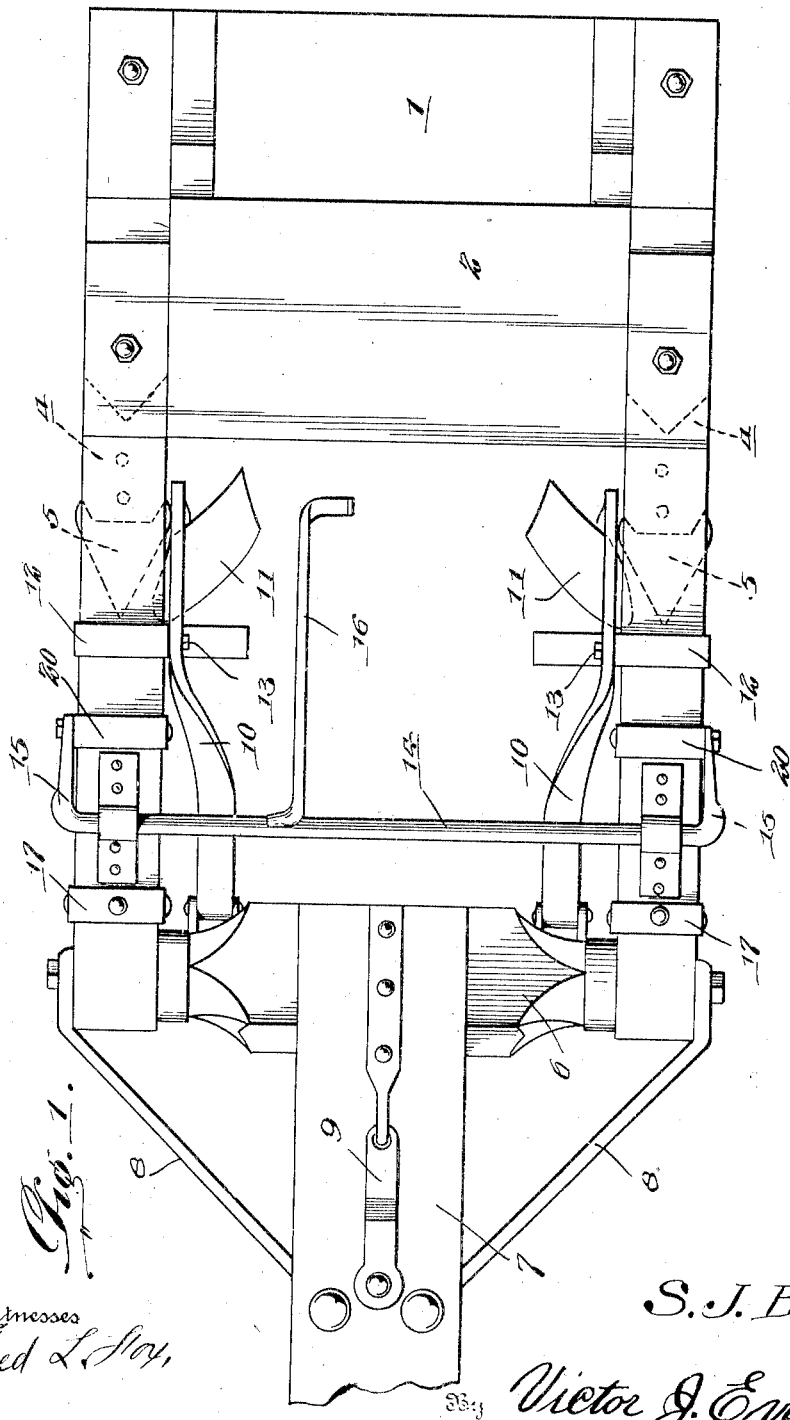

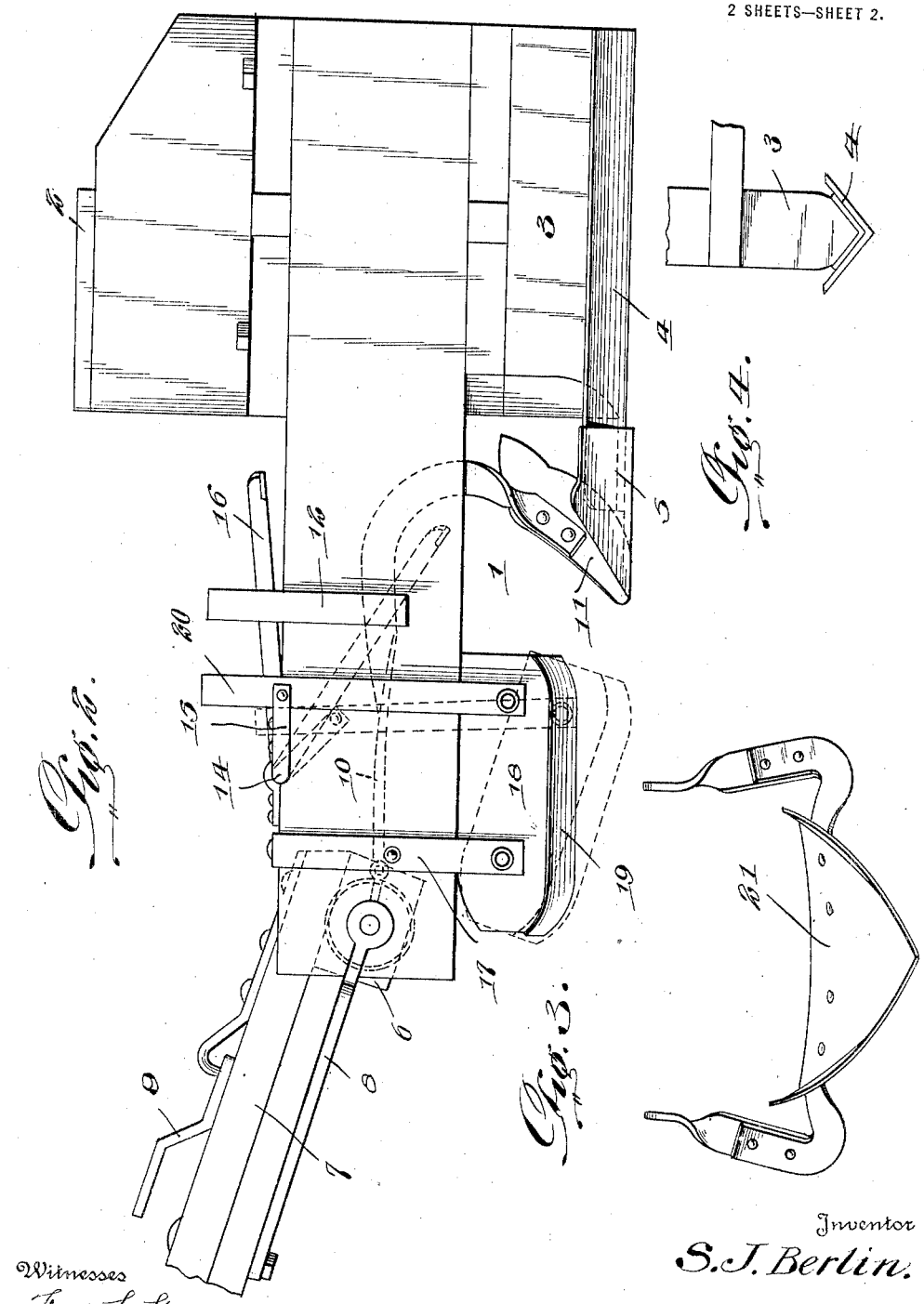

SOLOMON J. BERLIN, OF OXFORD, COLORADO.

CULTIVATOR AND DIGGER.

1,334,214.

Specification of Letters Patent.  Patented Mar. 16, 1920.

Application filed September 23, 1919. Serial No. 325,669.

*To all whom it may concern:*

Be it known that I, SOLOMON J. BERLIN, a citizen of the United States, residing at Oxford, in the county of La Plata and State of Colorado, have invented new and useful Improvements in Cultivators and Diggers, of which the following is a specification.

This invention relates to cultivators and root diggers and it consists in the novel features hereinafter described and claimed.

An object of the invention is to provide a combined implement of the character stated which is of simple and durable structure and which may be used for cultivating the soil or digging roots as desired there being means provided upon the implement for forming furrows or trenches adjacent the rows of standing plants and the said furrows or trenches may receive water from irrigating ditches whereby the water is led to the plants of the rows.

In the accompanying drawing:—

Figure 1 is a plan view of the cultivator and digger.

Fig. 2 is a side elevation of the same.

Fig. 3 is a front elevation of the digging device.

Fig. 4 is a fragmentary front elevation of one of the runner blocks and the strip secured thereto.

The cultivator and digger comprises a frame 1 which is preferably constructed of pieces of wood. A seat 2 is mounted upon the frame 1 in any suitable manner. Runner blocks 3 are attached to the sides of the frame 1 and the said blocks are provided at their lower edges with V-shaped strips 4 preferably of sheet iron. The forward portions of the strips 4 project in front of the forward ends of the blocks 3 and the said strips carry at their forward ends plow points or blades 5.

A shaft 6 (of wood) is journaled between the forward ends of the side pieces of the frame 1 and a tongue 7 is fixed to the shaft 6. Suitable braces 8 are provided for holding the tongue in proper position with relation to the shaft and a draft device 9 is mounted upon the rear end portion of the tongue. Beams 10 are pivotally connected at their forward ends with the rear side of the shaft 6 and the said beams may swing vertically. The rear portions of the beams are downwardly curved and carry plow points 11. The points may be in the form of mold boards or any other suitable form of plate may be attached to the beams. The points 11 are located within the points 5 carried at the forward ends of the strips 4.

Guides 12 are movably mounted upon the intermediate portions of the side pieces of the frame 1 and the beams 10 are connected with the guides by means of pivot bolts 13.

A shaft 14 is journaled upon the side pieces of the frame 1 and the said shaft is provided at its ends with laterally disposed arms 15. A treadle arm 16 is fixed to the intermediate portion of the shaft 14 and an operator who occupies the seat 2 may place his foot upon the rear end of the treadle arm 15 and depress the same whereby the shaft 14 is turned.

Clips 17 are fixed to the intermediate portions of the side pieces of the frame 1 and blocks 18 are pivotally connected at their forward ends with the lower portions of the clips 17 and are located in advance of the runner blocks 3 hereinbefore described. The blocks 18 have their lower edges inclined inwardly and covered with metallic strips 19. The strips and lower corners of the blocks are curved upwardly, as shown in Fig. 1 of the drawings. Yokes 20 are pivotally connected at their ends with the rear portions of the blocks 18 and the sides of the yokes extend along the sides of the side pieces of the frame 1. The arms 15 of the shaft 14 are pivotally connected at their ends with the outer sides of the yokes 20. Consequently it will be seen that as the shaft 14 is turned the arms 15 are swung whereby the yokes 20 are moved transversely of the side pieces of the frame 1 and the rear ends of the blocks 18 are raised or lowered. Therefore means are provided for raising or lowering the forward end of the frame 1.

When the implement as hereinbefore described is in operation the strips 19 make furrows in the soil adjacent the rows of standing plants. The plate or points 11 cast the soil away from the furrows and the strips 4 move along the bottoms of the furrows and smooth or compact the same. These furrows may be used for conducting water to the roots of the plants which stand in the rows.

If desired the plates or points 11 may be detached from the rear ends of the beams and a digging device 21 may be attached to the beams. When the implement is equipped with the digging device it may be used for digging potatoes, beets, or similar vegetables.

From the foregoing description taken in conjunction with the accompanying drawing it will be seen that a combined cultivator and digger of simple and durable structure is provided and that the same may be used for economically forming furrows in the soil and for cultivating the soil, also the device may be readily transformed from a cultivator to a digger and used for lifting beets, potatoes and similar vegetables above the surface of the soil.

Having described the invention what is claimed is:—

1. An agricultural implement comprising a frame, blocks attached to the sides of the frame, V-shaped strips carried at the lower edges of the blocks, points mounted upon the forward ends of the strips, a shaft journaled at the forward portion of the frame, beams pivotally connected with the shaft, guides pivotally connected with the beams and engaging the frame and points carried by the beams and located between the points upon the strips.

2. An agricultural implement comprising a frame, blocks carried by the frame and having V-shaped strips, clips mounted upon the frame, blocks pivoted to the clips, V-shaped strips attached to the lower edges of the blocks, yokes pivotally connected with the blocks and slidably mounted upon the frame, a shaft journaled upon the frame and provided with arms which are pivotally connected with the yokes and a treadle arm fixed to the shaft.

3. An agricultural implement comprising a frame, runners attached to the frame and provided with V-shaped strips, points mounted at the forward ends of the strips, a shaft journaled upon the frame, beams pivotally connected with the shaft and carrying at their rear ends plates, guides movably mounted upon the frame and pivotally connected with the beams, clips mounted upon the frame, blocks pivoted to the clips, V-shaped strips attached to the lower edges of the blocks, yokes slidably mounted upon the frame and pivotally connected with the blocks and a lever mechanism mounted upon the frame and operatively connected with the yokes.

In testimony whereof I affix my signature.

SOLOMON J. BERLIN.